2,982,779
PROCESS FOR THE PRODUCTION OF CYANOHYDRINS

William L. Fierce, Crystal Lake, and Walter J. Sandner, Carpentersville, Ill., assignors to The Pure Oil Company, Chicago, Ill., a corporation of Ohio No Drawing. Filed May 28, 1958, Ser. No. 738,266

13 Claims. (Cl. 260—465)

This invention relates to new and useful improvements in processes for the preparation of cyanohydrins and more particularly to the preparation of ketone and aldehyde cyanohydrins by the reaction of hydrogen cyanide with ketones or aldehydes in the gas phase.

It is well known that hydrogen cyanide reacts with aliphatic and aromatic aldehydes and ketones to form the corresponding cyanohydrins in liquid phase or in solution, and that the reaction is accelerated by the presence of basic catalysts. While the liquid-phase catalytic reaction produces relatively high yields, it is subject to the disadvantage that basic catalysts promote competing side reactions such as aldolization and polymerization. The liquid-phase reaction is further subject to the objection that it involves separation of the cyanohydrin product from the basic catalyst which usually results in very high losses of product due to decomposition. Thus, the reaction of aldehyde and ketones with hydrogen cyanide in the liquid phase or in solution in the presence of basic catalysts may produce very high yields of cyanohydrins in the initial reaction, but a very substantial loss of yield occurs during the separation of the product from the catalyst. It would be desirable to produce cyanohydrins by a gas-phase reaction of hydrogen cyanide and aldehydes or ketones at elevated temperatures. However, mixtures of hydrogen cyanide and aldehydes or ketones have been heated at temperatures ranging from 100° to 450° C. without production of any cyanohydrins, or any other products.

It is therefore one object of this invention to provide an improved process for preparation of cyanohydrins in the gas phase.

Another object of this invention is to provide a process for preparation of cyanohydrins by a reaction which does not involve separation of the product from the catalyst used.

A feature of this invention is the provision of a process for preparation of cyanohydrins by reaction of hydrogen cyanide with aldehydes or ketones in the gas phase at elevated temperatures in the presence of a high-surface-area, refractory, oxide catalyst.

Other objects and features of this invention will become apparent from time to time throughout the specification and claims as hereinafter related, This invention is based upon our discovery that aldehydes and ketones will react with hydrogen cyanide in the gas phase at temperatures in the range from about 100° to 450° C. in the presence of a high-surface-area, refractory, oxide catalyst. The cyanohydrins which are produced by this process are recovered by condensation from the gaseous reaction products and the process does not involve separation of cyanohydrins from a basic catalyst.

This invention is applicable to the preparation of cyanohydrins by reaction of hydrogen cyanide with any aldehyde or ketone which is readily vaporized under the reaction conditions. The ketones which are useful in this process are monofunctional hydrocarbyl acyclic ketones which include both symmetrical and unsymmetrical ketones such, for example, as acetone, methylethyl ketone, diethyl ketone, ethylpropyl ketone, dipropyl ketone, diamyl ketone, dioctyl ketone, dihexadecyl ketone, and acetophenone. Aldehydes which may be used are monofunctional hydrocarbyl aldehydes which include acetaldehyde, propionaldehyde, hexanal, octanal, dodecanal, benzaldehyde, etc. Thus, by reacting acetone, methylethyl ketone, acetaldehyde, or benzaldehyde with hydrogen cyanide, the product produced will be acetone cyanohydrin, methylethyl ketone cyanohydrin, acetaldehyde cyanohydrin, or benzaldehyde cyanohydrin, respectively.

This reaction is carried out in the temperature range of 100° to 450° C. in the presence of a high-surface-area, refractory, oxide catalyst. The catalysts which may be used include high-surface-area oxides such as silica gel, activated alumina, silica-alumina, zirconia, silica-zirconia, silica-titania, etc.

This reaction proceeds well at atmospheric pressure, although it may be carried either at subatmospheric or superatmospheric pressures. In carrying out this reaction, the preferred mol ratio of ketone or aldehyde to cyanogen is the stoichiometric ratio of 1:1. However, the ratios of ketone or aldehyde to cyanogen may be varied widely as, for example, 1:20 to 20:1, and still produce cyanohydrins as a reaction product. When the ratio of reactants varies from the stoichiometric ratio, there are problems of side reactions and of separation of the product from reactants, but the reaction is still satisfactory. The reaction gases may be passed through the reaction zone at a gaseous hourly space velocity of approximately 50 to 2000, with a space velocity of 100 to 1000 being preferred. In this process the term space velocity refers to the ratio of the volume of reactant gases, at standard temperature and pressure, charged per hour, to the volume of the reactant space. As indicated above, the reaction temperature may vary from 100° to 450° C. and is preferably in the range from about 150° C. to 300° C.

The preferred method of carrying out this process is to mix the ketone or aldehyde to be reacted and hydrogen cyanide in the gaseous state and pass the mixture through a heated reaction zone. When relatively non-volatile (high boiling point) aldehydes or ketones are to be reacted, they are fed as liquids directly to the reactor and vaporized directly into the reaction zone. Any type of reaction zone may be used which is resistant to attack by the reactants or reaction products. Quartz, high-silica glass, stainless steel, or other refractory and corrosion-resistant materials may be used. The reaction zone may be heated by a suitable means, such as combustion gases applied externally to the reactor, external or internal electrical heaters, including resistance heaters and induction heaters, heating tubes extending into the reactor, or hot refractory pebbles intermittently or continuously heated and supplied to the reactor.

EXAMPLE I

A number of experiments were carried out in which hydrogen cyanide and acetone were heated at elevated temperatures under a variety of conditions. In these experiments, helium was bubbled through liquid acetone at room temperature, and the resulting stream of helium plus acetone vapor was then blended with hydrogen cyanide and passed through an empty, electrically heated, tube of Vycor high-silica glass. The gas mixture charged to the reactor tube and the product gases were analyzed by mass spectrometer to determine the composition of the charge gas and the product gases. The experimental conditions and results are set forth in Table I:

Table I

| Run No. | 56-95 | 56-96 |
|---|---|---|
| Duration of run (min.) | 20 | 20 |
| Temperature (° C.) | 588 | 698 |
| Mole ratio of $CH_3COCH_3/HCN$ | 1.83 | 2.17 |
| Gaseous hourly space velocity of charge gas | 306 | 318 |
| Percent Conversion of HCN | 2.6 | 14.1 |
| Percent Conversion of $CH_3COCH_3$ | 4.4 | 38.5 |
| Acetonitrile:[1] | | |
| Molar Yield per pass | 0.0 | 7.9 |
| Selectivity | 0.0 | 56.5 |
| Acetone Cyanohydrin: | | |
| Molar Yield per pass | 0.0 | 0.0 |
| Selectivity | 0.0 | 0.0 |

[1] The yield per pass is defined as the mols of the indicated product formed, expressed as percent of the mols of HCN charged. The selectivity is similar percentage based upon the mols of HCN consumed.

From these and other experiments, it has been found that there is no reaction between hydrogen cyanide and acetone at temperatures below 500° C., and very little reaction between 500° and 600° C. Above 600° C., in the absence of catalysts, aliphatic nitriles are formed but no cyanohydrins.

EXAMPLE II

In another series of experiments acetone and hydrogen cyanide were passed through a reactor similar to that used in the other experiments. In these experiments, however, the reactor contained activated alumina catalyst. The catalyst used was F-10 activated alumina, manufactured by Aluminum Co. of America, which is a low-soda, granular alumina containing 0.09% $Na_2O$, 0.09% $SiO_2$, and having a surface area of 100 sq. meters per gram. In these runs a gaseous mixture of helium, acetone and hydrogen cyanide was passed through an electrically-heated, Pyrex tube containing the catalyst. The gas samples were analyzed by mass spectrometry, while the liquid products were collected, weighed, and analyzed by infrared spectroscopy. The conditions of these experiments are as set forth in Table II.

Table II

| Run No. | 57-65 | 57-66 |
|---|---|---|
| Catalyst used | [1] F-10 | [1] F-10 |
| Duration (min.) | 40 | 40 |
| Temperature (° C.) | 206 | 307 |
| Gaseous hourly space velocity of charge gas | 688 | 700 |
| Mol ratio of acetone/HCN | 1.03 | 1.07 |
| Percent HCN consumed | 41.2 | 86.2 |
| Percent acetone consumed | 48.8 | 75.8 |
| Acetonitrile:[2] | | |
| Molar Yield per pass | 0.0 | 0.47 |
| Selectivity | 0.0 | 0.54 |
| Acetone Cyanohydrin:[2] | | |
| Molar yield per pass | 13.6 | 7.8 |
| Selectivity | 33.0 | 9.0 |

[1] $Al_2O_3$.
[2] The molar yield per pass is defined as the mols of the indicated product formed, expressed as a percent of the mols of hydrogen cyanide charged. The selectivity is a similar percentage based upon the mols of hydrogen cyanide consumed.

EXAMPLE III

The conditions of Run 57-65 of Example II are repeated substituting silica gel as the catalyst. Hydrogen cyanide and acetone consumption is in excess of 40% and acetone cyanohydrin is obtained as a major product.

The conditions of Run 57-65 of Example II are repeated, substituting silica-alumina (75 wt. percent silica) as the catalyst. Acetone and hydrogen cyanide consumption is in excess of 40% and acetone cyanohydrin is obtained as the principal product.

The conditions of Run 57-65 are repeated substituting silica-zirconia (50 wt. percent silica) as the catalyst. The consumption of both of the reactants is in excess of 40% and acetone cyanohydrin is obtained as a principal product.

EXAMPLE IV

Acetone and hydrogen cyanide are reacted using an activated alumina catalyst at temperatures in the range from 100° to 450° C. The optimum yields and selectivities for formation of acetone cyanohydrin are obtained in the temperature range from 150° to 300° C., although some yield is obtained as low as 100° and as high as 450° C.

EXAMPLE V

The conditions of Run 57-65 of Example II are duplicated substituting diethyl ketone for acetone. The ketone and hydrogen cyanide conversions are in excess of 40% and diethyl ketone cyanohydrin is obtained as the principal product. The optimum temperature range using diethyl ketone as a reactant is between 150° and 300° C.

EXAMPLE VI

Acetophenone is vaporized directly into a Pyrex tube reactor maintained at 300° C. and containing activated alumina catalyst, together with gaseous hydrogen cyanide in approximately equimolar ratio. A substantial conversion of hydrogen cyanide and the acetophenone is observed and the principal reaction product obtained is the acetophenone cyanohydrin. The optimum temperature range for the reaction of acetophenone and hydrogen cyanide lies between 300° and 450° C.

EXAMPLE VII

Acetaldehyde and hydrogen cyanide in a 1:1 mol ratio are passed through an electrically-heated Pyrex tube containing activated alumina as catalyst and maintained at a temperature of about 200° C. for a period of 40 minutes. The reactants are circulated at a gaseous hourly space velocity of about 700. At the end of the reaction period, it is found that there is a substantial conversion of hydrogen cyanide and the acetaldehyde. The principal reaction product obtained is acetaldehyde cyanohydrin. The optimum temperature range for the reaction of acetaldehyde and hydrogen cyanide over the refractory oxide catalyst is about 150° to 300° C. In the absence of the catalyst no reaction takes place in this temperature range.

EXAMPLE VIII

Benzaldehyde is vaporized directly into an electrically-heated Pyrex tube, together with an equal molar amount of hydrogen cyanide, at a temperature of 250° C. The reaction tube contains granular silica-alumina (75% wt. silica) catalyst. After circulation of reactants for 40 minutes at a gaseous hourly space velocity of about 700, it is found that there is a conversion of hydrogen cyanide and benzaldehyde in excess of about 40%. Benzaldehyde cyanohydrin is obtained as the principal reaction product.

From the foregoing examples, it is seen that hydrogen cyanide and aldehydes or ketones do not react in the gas phase at temperatures between 100° and 450° C. in the absence of a catalyst. At higher temperatures, e.g., above 600° C., some reaction takes place but the products are aliphatic or aromatic nitriles rather than cyanohydrins. When aldehydes or ketones are reacted with hydrogen cyanide at temperatures in the range of about 100° to 450° C. in the presence of a high-surface-area, refractory oxide catalyst, an appreciable yield of the corresponding aldehyde cyanohydrin or ketone cyanohydrin is obtained.

While we have described this invention fully and completely, as required by the patent laws, including reference to several preferred embodiments of our invention, we wish it understood that within the scope of the appended claims this invention may be practiced otherwise than as specifically described.

What is claimed is:

1. A method of preparing a cyanohydrin which comprises reacting hydrogen cyanide with a compound of the group consisting of monofunctional $C_1$-$C_{16}$ hydrocarbyl aldehydes and ketones in the gas phase in the presence of a high-surface-area, refractory, oxide catalyst at a temperature in the range of about 100° to 450° C.

2. A method in accordance with claim 1 in which one of the reactants is a low-molecular-weight volatile ketone.

3. A method in accordance with claim 1 in which one of the reactants is a low-molecular-weight volatile aldehyde.

4. A method in accordance with claim 1 in which the catalyst used is activated alumina.

5. A method of preparing acetone cyanohydrin which comprises reacting hydrogen cyanide with acetone in the gas phase in the presence of an activated alumina catalyst, at a temperature of about 150°–300° C.

6. A method of preparing diethyl ketone cyanohydrin which comprises reacting hydrogen cyanide with diethyl ketone in the gas phase in the presence of an activated alumina catalyst, at a temperature of about 150°–300° C.

7. A method of preparing acetophenone cyanohydrin which comprises reacting hydrogen cyanide with acetophenone in the gas phase in the presence of activated alumina catalyst at a temperature of about 300°–450° C.

8. A method of preparing acetaldehyde cyanohydrin which comprises reacting hydrogen cyanide with acetaldehyde in the gas phase in the presence of a high-surface-area, refractory, oxide catalyst at a temperature in the range of about 150°–300° C.

9. A method of preparing benzaldehyde cyanohydrin which comprises reacting hydrogen cyanide with benzaldehyde in the gas phase in the presence of a high-surface-area, refractory, oxide catalyst at a temperature in the range of about 150°–300° C.

10. A method of preparing a cyanohydrin which comprises reacting hydrogen cyanide with a compound of the group consisting of monofunctional hydrocarbyl aldehydes and ketones, containing from 1 to 16 carbon atoms per hydrocarbyl radical, in the gas phase in the presence of a high-surface-area, refractory, oxide catalyst, selected from the group consisting of activated alumina, silica gel, silica-alumina, zirconia, silica-zirconia, and silica-titania at a temperature in the range from about 100°–450° C.

11. A method in accordance with claim 10 in which one of the reactants is a low-molecular-weight volatile ketone.

12. A method in accordance with claim 10 in which one of the reactants is a low-molecular-weight volatile aldehyde.

13. A method in accordance with claim 10 in which hydrogen cyanide is reacted with acetone.

References Cited in the file of this patent

UNITED STATES PATENTS

| | | |
|---|---|---|
| 2,101,823 | Dittmar | Dec. 7, 1937 |
| 2,668,175 | Reppe et al. | Feb. 2, 1954 |
| 2,752,383 | Belt | June 26, 1956 |